US007429337B2

(12) United States Patent
Czech et al.

(10) Patent No.: US 7,429,337 B2
(45) Date of Patent: *Sep. 30, 2008

(54) METHOD FOR REMOVING AT LEAST ONE AREA OF A LAYER OF A COMPONENT CONSISTING OF METAL OR A METAL COMPOUND

(75) Inventors: Norbert Czech, Dorsten (DE); Andre Jeutter, Grafenau (DE); Adrian Kempster, Hemel Hempstead (GB); Ralph Reiche, Berlin (DE); Rolf Wilkenhöner, Berlin (DE)

(73) Assignees: Siemens Aktiengesellschaft, Munich (DE); Diffusion Alloys, Ltd., Hatfield/Hertfordshire (GB)

( * ) Notice: Subject to any disclaimer, the term of this patent is extended or adjusted under 35 U.S.C. 154(b) by 60 days.

This patent is subject to a terminal disclaimer.

(21) Appl. No.: 11/541,253

(22) Filed: Sep. 29, 2006

(65) Prior Publication Data

US 2007/0023392 A1 Feb. 1, 2007

Related U.S. Application Data

(63) Continuation of application No. 10/490,567, filed as application No. PCT/EP02/05490 on May 17, 2002, now Pat. No. 7,138,065.

(30) Foreign Application Priority Data

Oct. 1, 2001 (EP) ................................. 01123593

(51) Int. Cl.
*C03C 25/68* (2006.01)

(52) U.S. Cl. ............................ 216/75; 216/77; 216/96; 216/100; 134/17; 134/19; 134/55

(58) Field of Classification Search ....................... None
See application file for complete search history.

(56) References Cited

U.S. PATENT DOCUMENTS 3,544,348 A 12/1970 Boone
3,622,391 A 11/1971 Baldi et al.

(Continued)

FOREIGN PATENT DOCUMENTS

EP 0 496 935 B1 4/1995

(Continued)

OTHER PUBLICATIONS

Ralf Burgel, Tibor Koromzay, Riener Redecker; Refurbishment Procedures for Stationary Gas Turbine Blades; Life Assessment and Repair Technology For Combustion Turbine Hot Section Components; Proceedings of a International Conference, Phoenix, Arizona, USA, Apr. 17-19, 1990; pp. 323-334.

*Primary Examiner*—Allan Olsen

(57) ABSTRACT

The invention relates to a method for removing an area of a layer of a component consisting of metal or a metal compound. According to prior art, corrosion products of a component are removed in a first step by applying a molten mass or by heating in a voluminous powder bed. This requires high temperatures or a large amount of space. The inventive method for removing corrosion products of a component is characterized in that a cleaning agent is applied locally, which removes the corrosion products by means of a gaseous reaction product.

18 Claims, 4 Drawing Sheets

U.S. PATENT DOCUMENTS

| | | | |
|---|---|---|---|
| 4,004,047 | A | 1/1977 | Grisik |
| 4,526,814 | A | 7/1985 | Shankar et al. |
| 4,566,939 | A | 1/1986 | Miller et al. |
| 4,724,172 | A | 2/1988 | Mosser et al. |
| 4,933,239 | A | 6/1990 | Olson et al. |
| 5,254,413 | A | 10/1993 | Maricocchi et al. |
| 5,547,770 | A | 8/1996 | Meelu et al. |
| 5,728,227 | A | 3/1998 | Reverman |
| 6,022,632 | A | 2/2000 | Olson et al. |
| 6,036,995 | A | 3/2000 | Kircher et al. |
| 6,042,879 | A | 3/2000 | Draghi et al. |
| 6,110,262 | A | 8/2000 | Kircher et al. |
| 6,199,276 | B1 | 3/2001 | Siebert et al. |
| 6,217,668 | B1 | 4/2001 | Czech et al. |
| 6,274,193 | B1 | 8/2001 | Rigney et al. |
| 6,993,811 | B2 | 2/2006 | Das et al. |
| 7,138,065 | B2 * | 11/2006 | Czech et al. .................. 216/55 |

FOREIGN PATENT DOCUMENTS

| | | | |
|---|---|---|---|
| EP | 0 713 957 | A1 | 5/1996 |
| WO | WO 93/03201 | A1 | 2/1993 |

* cited by examiner

METHOD FOR REMOVING AT LEAST ONE AREA OF A LAYER OF A COMPONENT CONSISTING OF METAL OR A METAL COMPOUND

CROSS REFERENCE TO RELATED APPLICATIONS

This application is a continuation of U.S. application Ser. No. 10/490,567, filed Mar. 19, 2004, now U.S. Pat. No. 7,138, 065, which is the US National Stage of International Application No. PCT/EP02/05490, filed May 17, 2002 and claims the benefit thereof. The International Application claims the benefits of European application No. 01123593.4 filed Oct. 1, 2001. All applications are incorporated by reference herein in their entirety.

FIELD OF THE INVENTION

The invention relates to a method for removal of a layer area of a part composed of metal or of a metal compound, in which a multi-component cleaning agent is applied in a simple manner to the part or to the layer area, as a result of which, after heat treatment of the part with the cleaning agent, the layer area can be removed more easily.

BACKGROUND TO THE INVENTION

In present-day modern power generating systems, such as gas turbine systems, the efficiency plays an important role, because this makes it possible to reduce the costs for operation of the gas turbine systems.

One possible way to improve the efficiency and thus to reduce the operating costs is to increase the inlet temperatures of a combustion gas within a gas turbine.

Ceramic heat insulation layers have been developed for this reason, which are applied to thermally loaded parts which, for example, are composed of superalloys, which on their own could no longer withstand the high inlet temperatures in the long term. The ceramic heat insulation layer offers the advantage of good temperature resistance owing to its ceramic characteristics, and the metallic substrate offers the advantage of good mechanical characteristics in this composite or layer system.

Typically, an adhesion promotion layer composed of MCrAlY (major parts) is applied between the substrate and the ceramic heat insulation layer, with M indicating that a metal composed of nickel, chromium or iron is used.

The composition of these MCrAlY layers may vary, but all the MCrAlY layers are subject to corrosion, despite the ceramic layer on them, due to oxidation, sulfidation, nitridation or other chemical and/or mechanical attacks.

The MCrAlY layer in this case is frequently degraded to a greater extent than the metallic substrate, that is to say the life of the composite system comprising the substrate and layer is governed by the life of the MCrAlY layer.

The MCrAlY intermediate layer is still functional only to a restricted extent after lengthy use while, in contrast, the substrate may still be fully functional.

There is therefore a requirement to reprocess the parts which have become degraded in use, for example turbine blades, guide vanes or combustion chamber parts, in which process the corroded layers or zones of the MCrAlY layer must be removed, in order, possibly, to apply new MCrAlY layers and/or a heat insulation layer once again. The use of existing, used substrates leads to a cost reduction during operation of gas turbine systems.

In this case, care must be taken to ensure that the design of the turbine blades or of the guide vanes is not changed, that is to say that the material is removed from the surface uniformly.

Furthermore, no corrosion products must be left behind which would form a fault source when a MCrAlY layer and/or a ceramic heat insulation layer is coated once again, or which would lead to poor adhesion of the heat insulation layer.

A method for removal of corrosion products is known from U.S. Pat. No. 6,217,668. In this method, the corroded part is accommodated in a large vat, with the part being arranged in a powder bed with an aluminum source. The vat must be partially closed and then heated in an oven. The heating process results in aluminum being supplied to the corroded part, as a result of which the areas can be removed by means of a subsequent acid treatment which would previously not have been able to remove it as well, that is to say it would have had greater resistance to removal.

A large amount of material is required for the powder bed, and the vat occupies a large amount of space in the oven during the heat treatment. The heating process also takes longer, owing to the high heat capacity.

A further method for removal of surface layers from metallic coatings is known from U.S. Pat. No. 6,036,995. In this method, the aluminum source is applied by means of a paste to a corroded part. However, the part must be heated with the paste until the aluminum melts, so that the aluminum does not diffuse into the part until this stage. The melted aluminum layer is difficult to remove, since it adheres to the part very well.

SUMMARY OF THE INVENTION

A method for removal of at least one layer area of a corroded part composed of a metal and/or of at least one metal compound, comprising: locally applying a multicomponent cleaning agent to one surface of the corroded part, the cleaning agent having an impregnation component can diffuse into the layer area, and the cleaning agent having an activation component; heat treating the part with the cleaning agent so that the at least one impregnation component and the activation component form gaseous compound; forming at least one sacrificial zone at least partially in the layer area which is to be removed from the part by the heat treating and by the gaseous compound coming into contact with the part, as a result of which a removal resistance of the layer area is reduced; and removing the layer with the sacrificial zone.

The invention overcomes the described disadvantage by means of a method as described in the claim.

In contrast, the method according to the invention has the advantage that layer areas and/or corrosion products can be removed from parts in a simple manner. This for the first time makes it possible to carry out the deposition of an impregnation agent from the gas phase in a locally controllable method, so that no impregnation takes place in areas which are intended to remain untreated, despite the gaseous bonding with the impregnation agent.

The method steps which are described in the dependent claims allow advantageous developments and improvements of the method specified in the claims.

It is advantageous to at least roughly remove the corrosion products or other areas, such as a heat insulation layer on a turbine blade, in an intermediate step of the method according to the invention before the application of a cleaning agent to the part or the layer area, because this simplifies the subsequent method steps, shortens the time involved, and thus reduces the costs.

The removal process can be carried out by mechanical methods, for example sandblasting, water jets, dry ice jets, and/or by chemical methods, for example an acid treatment.

If the cleaning agent at least partially adheres to the part, then, for example, corrosion products can be removed from the front face and rear face of the part at the same time, using the method according to the invention, in an advantageous manner.

The adhesion of the cleaning agent to the part can advantageously be carried out by the cleaning agent having a pasty consistency by, for example, the cleaning agent containing a binding agent.

The cleaning agent can also be mixed with a carrier liquid with or without a binding agent and can be brushed onto the part, or the part can be coated with the cleaning agent by immersion in a compound which can flow and is composed of liquid and cleaning agent.

The cleaning agent may also advantageously be applied only locally to the part, since areas which are not corroded do not need to have the cleaning agent applied to them, thus making it possible to save cleaning agent.

There is therefore no longer any need for masks either, in order to protect those areas in which no cleaning agent need be applied, as when application is carried out over a large area (powder bed, plasma spraying, running aluminum melt).

The cleaning agent is advantageously applied in the vicinity of the corrosion products because this results in the at least one component of the cleaning agent having only short diffusion distances to travel during the heat treatment.

By way of example, the cleaning agent is applied in a thin layer to the part, so that considerably less material is used than when the part is embedded in a powder bed. Furthermore, heat treatment without any vat means that no space is consumed by the voluminous vat in the oven, so that more parts can be accommodated in one oven cycle, thus reducing the process costs.

The lack of and the reduction in the masses of vats and cleaning agents, respectively, means that considerably less mass may be heated overall.

The removal process is carried out uniformly over the surface of the uncorroded part, by means of a removal method or an acid treatment. However, the corrosion produces areas on the part and/or corrosion products which can no longer be removed as easily by the acid treatment, that is to say they are more resistant to removal. If an acid treatment is used as the removal method, this leads to undesirable, non-uniform removal from corroded or degraded parts.

The formation of at least one sacrificial zone in the layer area to be removed, which is achieved by the treatment according to the invention, that is to say the areas of the part which are more resistant to removal, means that those areas which have become more resistant to removal by degradation can be removed in the same way as material on the non-degraded part, and the high resistance to removal which exists in any case in a layer area which is not degraded is reduced.

This allows corroded and uncorroded material to be removed from the part uniformly.

In the case of MCrAlY layers, the sacrificial zone advantageously has a metallic impregnation component, advantageously aluminum, an aluminum compound or an aluminum alloy.

The cleaning agent may also advantageously contain the metal component in the form of a metal complex. There is therefore no need, for example, to mix a metallic powder with a carrier substance or with the activation agent.

The impregnation component must at least partially diffuse out of the cleaning agent into the part. This is advantageously achieved by the impregnation component being applied to the part in a gaseous form. The gaseous compound is produced by a reaction with the activation agent, with the impregnation means advantageously not being melted, thus reducing the process temperatures and hence the process costs.

Halogen compounds, for example ammonium chloride, which forms aluminum chloride with aluminum, are advantageously used as a cheap and easily available activation agent.

The formation of the gaseous compound can be controlled by advantageously mixing a carrier substance, for example aluminum oxide, with the cleaning agent, thus controlling the gas formation process, and making it uniform.

The method is advantageously suitable for layer systems such as a turbine blade, which have a layer system comprising a metallic substrate, an MCrAlY layer and a ceramic heat insulation layer applied to it.

Corrosion products on the MCrAlY layer lead to depletion of aluminum in the MCrAlY layer underneath the corrosion products ($Al_2O_3$) and, in consequence, these are more resistant to acid treatment. If the cleaning agent contains aluminum as a metallic component, the aluminum once again provides aluminum enrichment, on the basis of the method according to the invention, in those regions of the MCrAlY layer which were previously depleted of aluminum, so that these areas can then be resolved in the same way as the MCrAlY layer by means of an acid treatment, resulting in the corrosion products which are located on these areas also being dissolved.

The method according to the invention allows layer areas which are resistant to removal to be removed in an advantageous manner, or else degraded areas, for example areas which contain corrosion products which form a layer on the corroded part, or else corrosion products which are located underneath the surface of the corroded part.

After a certain heat treatment time, the area of the cleaning agent which is arranged on the part, close to the surface of the part, is depleted of the at least one impregnation component. The heat treatment is thus ended once the sacrificial zones are large enough, that is to say in the case of an MCrAlY layer, once the regions which were depleted of aluminum have been sufficiently enriched with aluminum once again. If this is not yet the case, the cleaning agent can be removed and the part can then be subjected to a thermal treatment, with the impregnation component of the cleaning agent, which is already present in the part as a result of the diffusion process, advantageously being allowed to penetrate deeper by diffusion into the part, thus increasing the depth of the sacrificial zone or sacrificial layer in an advantageous manner.

An optimum temperature for the thermal treatment is higher than the temperature for the heat treatment but below the solution annealing temperature of the part.

BRIEF DESCRIPTION OF THE DRAWINGS

Exemplary embodiments of the method according to the invention are illustrated in the figures, in which.

DETAILED DESCRIPTION OF THE INVENTION

Figure 1:
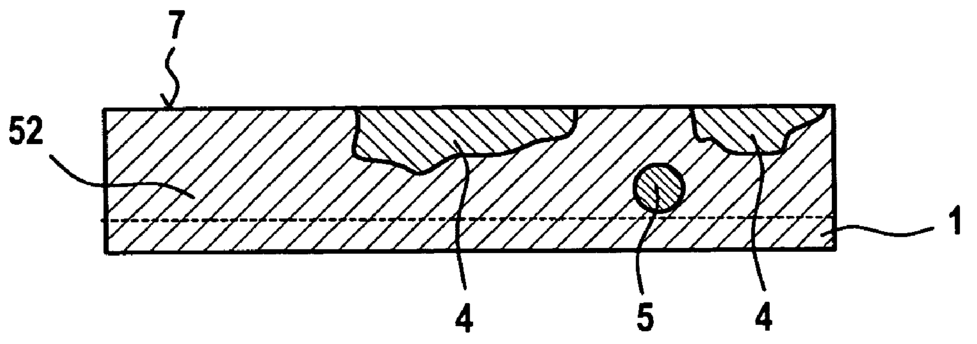
FIG. 1 shows a corroded metallic part.

FIG. 1 shows a part 1 composed of metal, of a metal alloy, or of a metal compound which has external corrosion products 4 on a surface 7 and/or has internal corrosion products 5 on the interior of the part 1, which corrosion products are present, for example, in regions which are formed separately from one another. The corrosion products 4 may also be cohesive or may be present over the entire surface 7, that is to say forming a corrosion layer.

Figure 5:
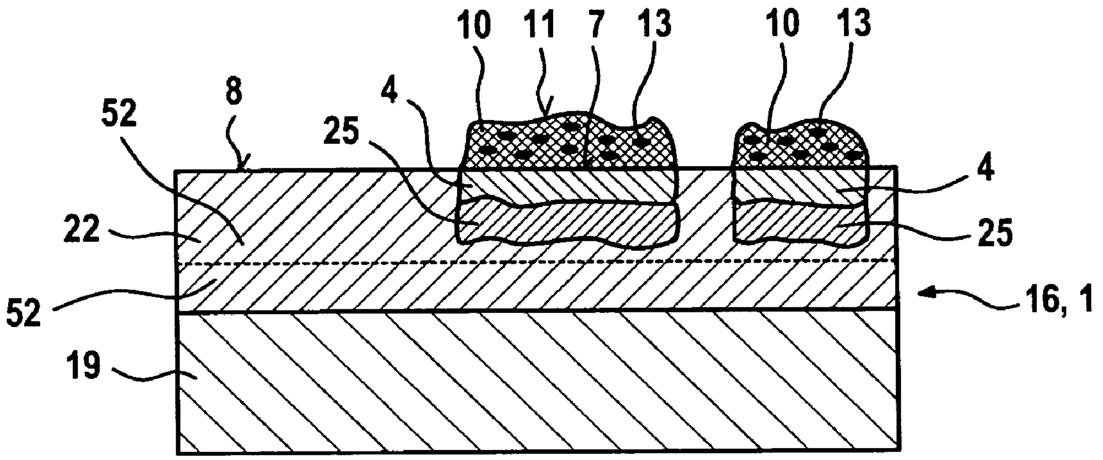
FIG. 5 shows a layer system in which one layer has corroded areas.
Figure 6:
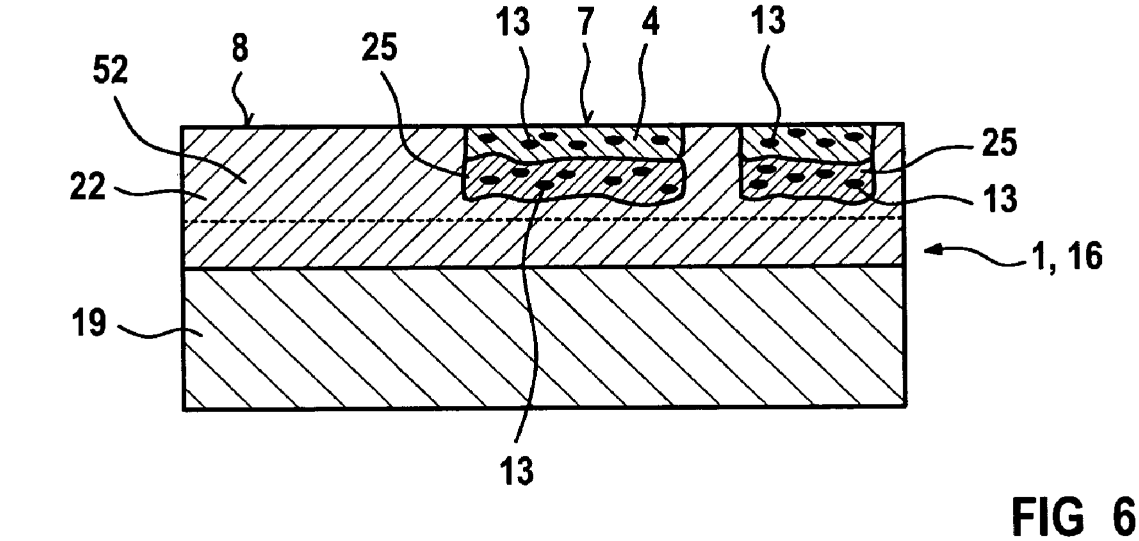
FIG. 6 shows another layer system in which one layer has corroded areas.

The part 1 may be solid, may be a layer or may be an area of a composite or layer system 16 (FIGS. 5, 6). The corrosion products 4, 5 have been formed during use of the part 1 and are undesirable for further use for the part 1, and must be removed. This is frequently done by treatment in an acid bath.

However, the material of the part 1 may have degraded areas and the corrosion products 4, 5 may react differently in the acid bath. The different dissolving characteristics in the acid bath are caused by the different dissolving characteristics of the corrosion products 4, 5, or because an original composition of the material of the part 1 has changed (FIGS. 5, 6), for example because the corrosion product 4, 5 has extracted a component from an area of the part 1 in the area around the corrosion product 4, 5, the so-called depletion region. This results in non-uniform removal or no removal of the corrosion products, or of the material in the depletion region.

The method according to the invention allows the corrosion products to be removed completely and uniformly with the material of the part 1.

In a first method step, by way of example, the corrosion products or other areas may in this case be removed by mechanical methods, such as sandblasting and/or chemical means, such as an acid bath.

Figure 2:
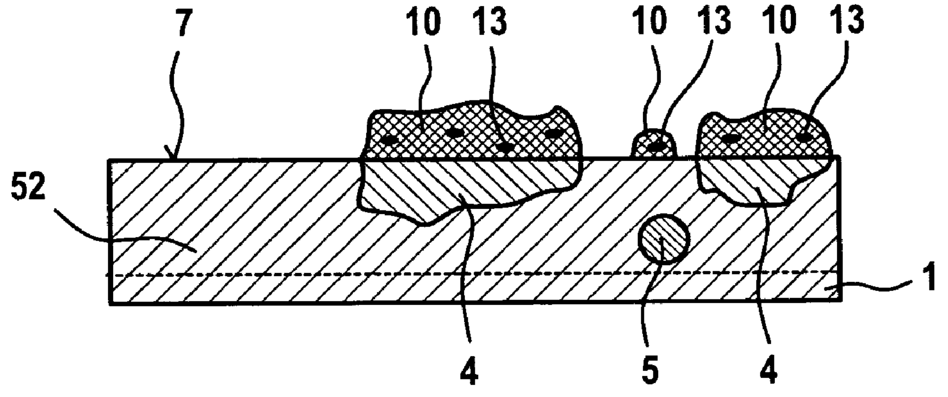
FIG. 2 shows a part to which a cleaning paste has been applied which contains a metallic component which penetrates, by virtue of a further method step, into the corroded area (FIG. 3) and only then allows the corroded area of the part to be dissolved (FIG. 4).

In a further method step, a multicomponent cleaning agent 10 is applied to the corroded part 1, in particular in the areas with the corrosion products 4, 5 which, in this example, represent the areas which are resistant to removal (FIG. 2), that is to say the layer area 52. The layer area 52 to be removed is identified by a dashed line, and comprises all the corrosion products 4, 5.

The cleaning agent 10 contains at least one impregnation component 13 which, during heat treatment, reacts with at least one activation component of the cleaning agent 10 to form at least one gaseous compound.

The gaseous compound results in the impregnation component 13 being brought into contact with the part 1 or being precipitated there where, for example, it forms an impregnation layer in the material of the part 1. The impregnation agent diffuses from this impregnation layer or directly from the gaseous compound into the areas with the corrosion products 4, 5. The impregnation component 13 is then at least partially present in the areas with the corrosion products 4, 5.

Figure 3:
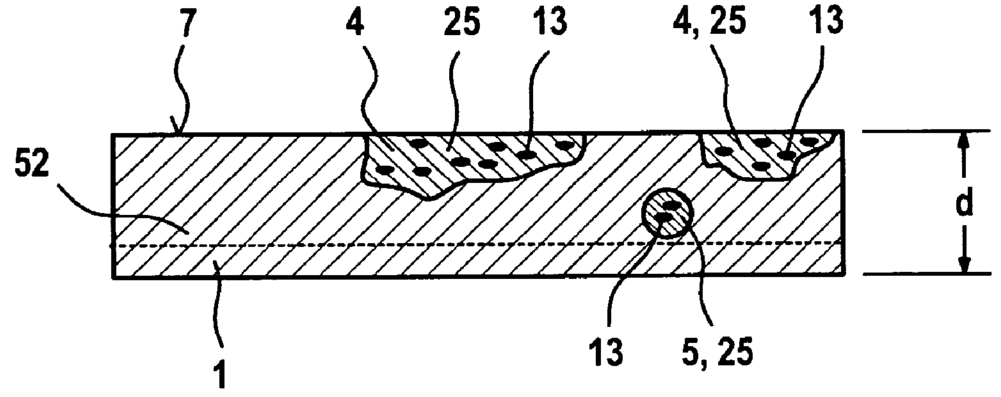
FIG. 3 shows the corroded metallic part with a sacrificial zone.

The area which is formed in this way, the so-called sacrificial zone 25 (FIG. 3), can be removed uniformly together with the material of the part 1, for example by means of an acid bath. A layer area 52 to be removed is identified by a dashed line. The layer area 52 to be removed comprises all of the corrosion products, but may also be deeper than the deepest corrosion product 5.

Figure 4:
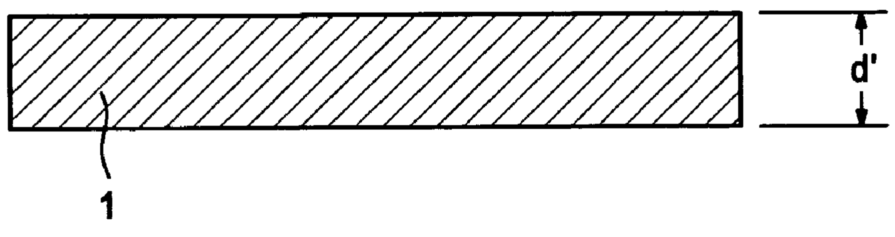
FIG. 4 shows the part without any internal or external corrosion products.

The acid treatment reduces the thickness of the part 1 from a thickness d (FIG. 3) to a lesser thickness d' (FIG. 4).

FIG. 4 shows a part 1 without any internal or external corrosion products 4, 5, as a result of the treatment based on the method according to the invention.

The choice of the material for the at least one impregnation component depends on the composition of the material of the part 1 and/or of the corrosion products 4, 5.

The activation component has the object of applying the impregnation component to the surface 7 of the part. This is achieved because the activation component can form a gaseous compound with the impregnation component, and this gaseous compound can be deposited on the surface 7 of the part 1. Halogen compounds, for example, may be used for this purpose.

With regard to the method for application of the cleaning agent, reference is made to U.S. Pat. No. 6,217,668, which is expressly included as part of this disclosure.

FIG. 5 shows a layer system 16 as a part 1, by way of example in the form a turbine blade or guide vane.

In this case, the layer system 16 comprises a substrate 19, for example composed of a superalloy, for example with the basic composition $Ni_3Al$. A layer 22 is applied to the substrate 19, for example with the composition MCrAlY, where M represents a chemical element Cr, Ni or Fe. This so-called MCrAlY layer forms a corrosion protection layer, which can also act as an adhesion promotion layer for a ceramic heat insulation layer which is not illustrated but is applied to the layer 22.

During use of the layer system 16, oxidation, nitridation or sulfidation occur, by way of example, that is to say degradation of the MCrAlY layer 22, so that areas with corrosion products 4, 5 (not shown) are formed in the layer 22.

The corrosion products 4, 5 form a layer which exists at least in places in, on or underneath the surface 7 of the part 16.

These corrosion products 4, for example aluminum oxide or other aluminum compounds, extract aluminum from the MCrAlY layer 22, so that at least one sacrificial zone 25 of aluminum-depleted MCrAlY is formed in the vicinity of the area with the corrosion products 4, mainly underneath the corrosion products, that is to say in the direction of the substrate 19. These depleted regions in this example represent the area which is more resistant to removal, that is to say the layer area 52. The layer area 52 to be removed is identified by a dashed line, and comprises all of the corrosion products 4, 5, or the entire layer 22.

The MCrAlY layer may also be depleted of chromium (Cr), so that the impregnation component 13 has, for example, the elements Al and/or Cr.

The impregnation component 13 may also contain other metals, for example cobalt, or elements or combinations thereof.

Both the corrosion products 4 and the sacrificial zone 25 have greater resistance to acid in the acid bath than the material of the layer 22, that is to say the MCrAlY.

In a first method step, the ceramic heat insulation layer, the corrosion products or other areas can be removed roughly by mechanical methods, such as sandblasting and/or chemical means, for example an acid bath.

The application of the cleaning agent 10 with the metal component 13 and the subsequent heating results in diffusion of the metal component 13 which, in this example, contains aluminum, both into the areas with the corrosion products 4 and into the sacrificial zones 25, so that the at least one metal component 13 is provided there. After, and only after, the enrichment with the metal component 13, a specific layer thickness of the layer 22 (MCrAlY) can be removed uniformly in acid bath treatment of the layer system 16.

The cleaning agent 10 may also have two or more metallic components 13 (Al, Cr) if this is required for the composition of the corrosion products or of the depleted sacrificial zones 25.

The metallic component 13 is, for example, mixed with at least one carrier substance, for example aluminum oxide or aluminum silicate. The cleaning agent 10 may also contain the metallic component 13 in the form of a metal complex.

The cleaning agent 10 likewise has at least one activation agent, for example a halogen compound, for example in the form of ammonium chloride ($NH_4Cl$).

During the heat treatment of the part 1 with the cleaning agent 10, the aluminum reacts as the meta component 13 with the halogen compound to form a gaseous compound. With ammonium chloride as the example, this gaseous compound is aluminum chloride. The gaseous compound penetrates into the at least one sacrificial zone 25 and allows the aluminum to diffuse into the part 1 by, for example, forming an impregnation layer (FIG. 6). There is therefore no need for the metal component 13 to be melted. However, it is also possible for the gaseous compound to be formed only at temperatures which are above the melting point of the at least one impregnation component since, for example, sublimation occurs.

In the example of aluminum fluoride, the impregnation component 13 and the activation component are contained in one compound (for example $AlF_3$). A gaseous compound aluminum fluoride (AlF) is formed during the heat treatment.

The heat treatment can be carried out in a vacuum or in hydrogen and/or argon as inert gases.

In addition to the metal component 13, the carrier substance and the activation agent, the cleaning agent 10 may also have, for example, an organic binding agent (carboxyl methacrylate, carboxyl methylcellulose or similar compounds), so that the cleaning agent 10 has a pasty or foam-like consistency which can thus be applied well to the corroded part 1 and, by virtue of the binding agent, can adhere to the part 1, 16.

A liquid also allows a cleaning agent compound which can be poured to be produced, in which the part 1 is immersed, with the cleaning agent 10 adhering to the surface 7 of the part 1 once the liquid has dried.

The invention is not restricted to the application methods mentioned.

Once the part 1 has been heat-treated for a specific time with the cleaning agent 10, the concentration of the metal component 13 in the area of the cleaning agent 10 facing the surface 7 is reduced. Only a small amount of a metal component 13, or, in the extreme, no more metal component 13, can diffuse into the part 1 from this area. Further, desired deeper penetration of the metal component 13 into the depth of the material 1 takes place only by further diffusion of the metal component 13 which has already diffused into it. However, keeping the part 1 at a raised temperature for a lengthy period would lead to the metal component 13 passing from a surface 11 of the cleaning agent 10 via the gaseous compound to surface areas 8 of the part 1 to which no cleaning agent 10 has been applied, and when no penetration of the metallic component 13 or of the reaction products is desirable, either.

The cleaning agent is thus in this case removed from the heat treatment after a certain time, and only further, desirable penetration of the metal component 13 into the depth of the material 1 takes place by diffusion of the metallic component 13 which has already diffused into the part 1, on the basis of a thermal treatment of the part 1, without any cleaning agent 10. The thermal treatment is made possible, for example, by solution annealing of the part 1.

The removal of the cleaning agent 1 presents no problems since the metallic component 13 has not melted.

The cleaning agent 10 can be applied locally, in particular over the areas which are more resistant to removal, over a large area or over the entire area of the part 1, 16.

Parameter example:

Layer material: MCrAlY,

Depth of the corrosion products in the layer: 150 μm (depleted Al area),

Application of the cleaning agent 10 results in a sacrificial zone 25 down to a depth of 80 μm during heat treatment at 925° C. for a time of two hours, After removal of the cleaning agent, a thermal treatment is carried out at 1120° C. for at most 20 hours:

The depth of the sacrificial zone 25 is 150 μm.

The duration of the thermal treatment and the temperature can be adapted on the basis of calibration curves (diffusion depth as a function of the time and temperature) for the physical extent of the corrosion products in the component.

A mask layer can be applied after the application of the cleaning agent 10 and before the heating process, in order to prevent the metallic component 13 from passing from the surface 11 of the cleaning agent 10 to surfaces 8 of the part 1 to which no cleaning agent was applied and where no penetration of the metallic component 13 is desirable either. The cleaning agent 10 can thus remain on the part 1, with heat treatment nevertheless being carried out in order to achieve the effect described above.

The invention is not restricted to parts of gas turbines, but also works in the case of parts which have at least one layer, for example an oxidation protection layer, acid protection layer or corrosion protection layer.

The invention is likewise not restricted to parts which have no layers, but whose corrosion products must be removed, for example in the case of reaction vessels in the chemical industry.

Figure 7:
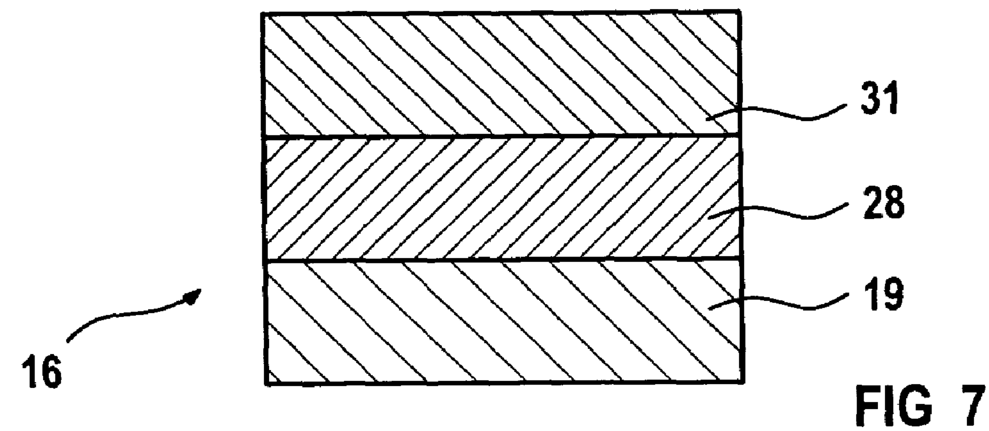
FIG. 7 shows another layer system.

FIG. 7 shows a layer system 16 which comprises a substrate 19, for example a nickel-based superalloy, an intermediate layer, in particular an MCrAlY layer 28, and an outer heat insulation layer 31.

The layer system 16 has been subjected to mechanical and thermal loads in use and is intended to be refurbished for use once again. In the process, the heat insulation layer 31 is removed, for example by sandblasting. This may be achieved easily by mechanical means, since the heat insulation layers 31 are generally ceramic, that is to say brittle, layers. The at least one intermediate layer 28 is metallic, and is more difficult to remove by mechanical means.

Figure 8:
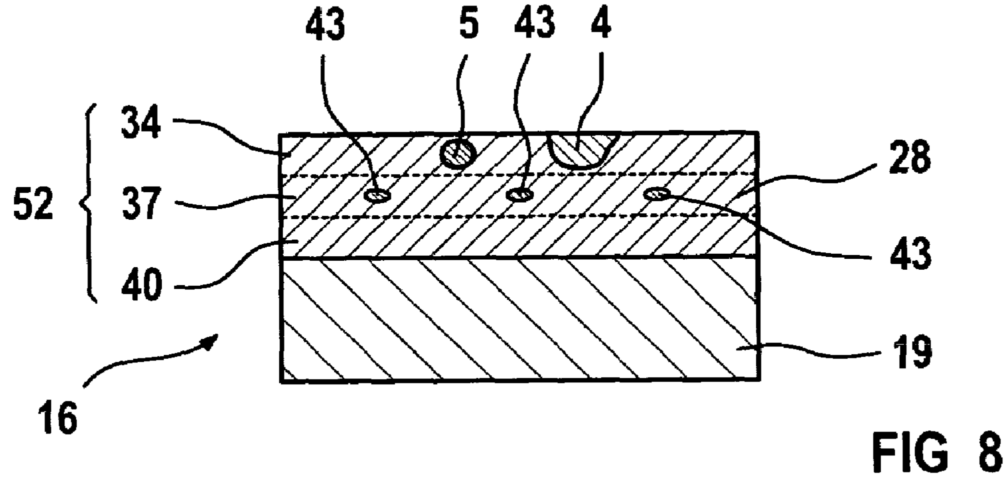
FIG. 8 shows degraded areas of a layer in the layer system, which are removed by means of the method according to the invention (FIG. 9).

FIG. 8 shows the layer system 16 from which the heat insulation layer 31 has already been removed, and with the intermediate layer 28 shown enlarged. The intermediate layer 28 is degraded. In a situation where corrosion products, that is to say oxides, nitrides and sulfides, have been formed or where phase segregation has taken place, degradation means, for example, coagulation of aluminum phases 43 or a change to the concentration structure as a result of diffusion. However, the intermediate layer 28 does not necessarily appear as follows: in a first zone 34 to which the heat insulation layer 31 was applied there are outer corrosion products 4 and inner corrosion products 5, which are produced by contact and reaction with a reactive medium.

In a second zone 37, which is adjacent to the first zone 34 in the direction of the substrate 19, there are, for example, no corrosion products, although diffusion caused by thermal loading has resulted in coagulation of aluminum, aluminum phases or other elements.

The second zone 37 is adjacent to a third zone 40, which is located between the substrate 19 and the second zone 37. In the third zone 40, the concentration of the intermediate layer 28 has changed from its original composition owing to diffusion of elements into the substrate 19. By way of example, in the case of an MCrAlY intermediate layer 28 and an Ni—Al superalloy as the substrate 19, this is aluminum, whose concentration is higher in the MCrAlY layer than in the substrate 19, and which thus diffuses into the substrate owing to the concentration difference. Thus, for example, the entire intermediate layer 28 is degraded, and represents the layer area 52 to be removed.

However, it is also possible for only the first zone and the second zone 34, 37 to be degraded and for the third zone 40 not to exhibit any degradation phenomena whatsoever. Nevertheless, the third zone 40 can also partially be included in a sacrificial zone 25, and can be removed, by impregnation with the impregnation agent 13.

Figure 9:
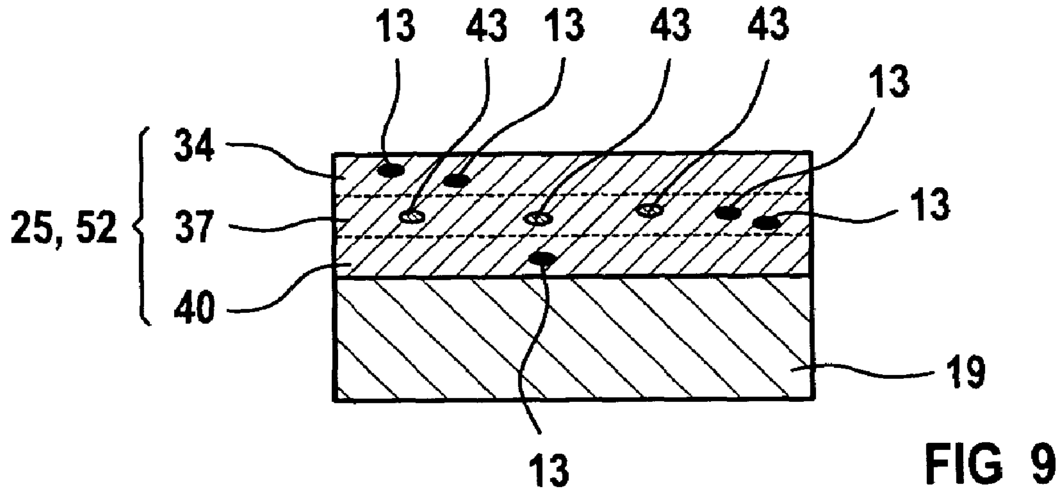
FIG. 9 shows another layer system.

The method according to the invention as described in FIGS. 1 to 4 is used to remove the entire intermediate layer 28, by the impregnation agent 13 diffusing into the entire intermediate layer 28 as far as the substrate 19 (FIG. 9). The intermediate layer 28 is removed as already described further above.

Figure 10:
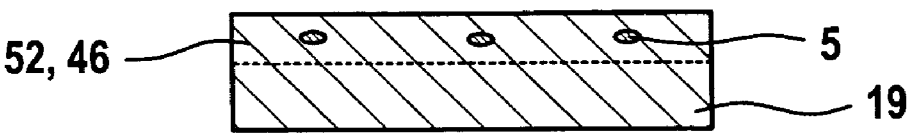
FIG. 10 shows a substrate with a degraded area, which is removed by means of the method according to the invention (FIG. 11).

FIG. 10 shows a substrate 19, for example a nickel-based superalloy for a turbine blade, which has been degraded by use in a degraded area 46 close to the surface, which represents the layer area 52 to be removed. The degraded area 46 has been produced, for example, by corrosion, by diffusion of elements into the substrate 19, or by diffusion of elements out of the substrate 19 into layers or layer areas of the substrate located on it.

Figure 11:
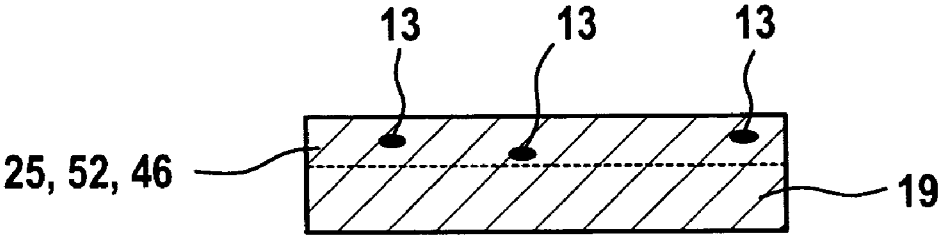
FIG. 11 shows another layer system.

The method according to the invention is used to introduce an impregnation agent 13 into the degraded area 46, so that the degraded area 46 becomes a sacrificial zone 25, which can be removed completely and more easily (FIG. 11). The layer 52 to be removed comprises at least the degraded area, but may also be larger than this.

Figure 12:
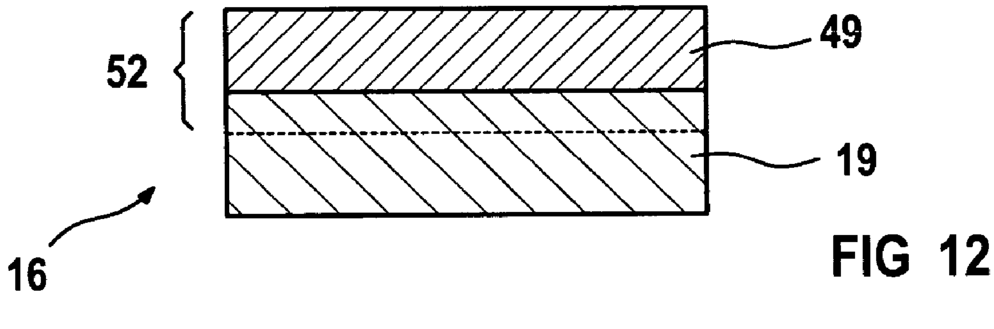
FIG. 12 shows a layer system with a chromium layer, which is removed by means of the method according to the invention (FIG. 13).

The layers which can be removed by the method need not necessarily be degraded. For example, FIG. 12 shows a layer system 16 which comprises a substrate 19 and, for example, a chromium layer 49 which has not been degraded and which represents the layer area 52 to be removed, since a layer containing chromium or a chromium layer 49 is highly resistant to removal by means of chemical removal methods.

However, the application example is not restricted to a chromium layer, and the chromium layer may also be degraded, for example by corrosion. The layer 49 is difficult to remove by the normal removal methods such as acid stripping.

Figure 13:
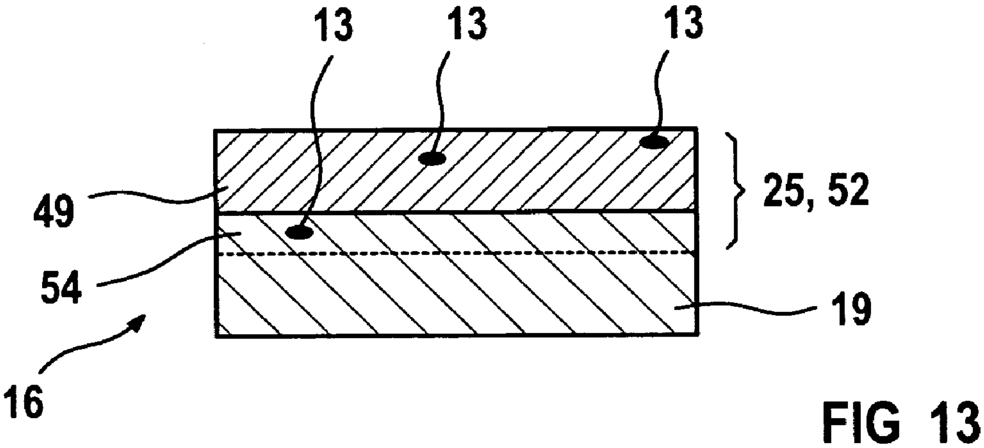
FIG. 13 shows another layer system.

The method according to the invention allows the impregnation agent 13 to penetrate into the layer 49, as a result of which the layer 49 can be removed more easily by conventional methods, for example acid stripping (FIG. 13), since the resistance to removal has been reduced.

If the substrate 19 is likewise partially degraded, the heat treatment allows the impregnation component 13 to penetrate into the substrate, or the sacrificial zone 25 is enlarged by an extension zone 54 as a result of diffusion during the thermal treatment.

The invention claimed is:

1. A method for removal of a layer area of a superalloy component, the layer area containing a metal and a corroded portion, comprising:

applying a multi-component cleaning agent locally to a surface of the superalloy component, the cleaning agent having an impregnation component that diffuses into the layer area and an activation component;

heat treating the superalloy component with the applied cleaning agent so the impregnation component and the activation component form a gaseous compound;

forming a sacrificial zone partially in the layer area to reduce a removal resistance of the layer area;

removing the cleaning agent from the surface of the superalloy component;

thermally treating the superalloy component; and removing the layer area from the superalloy component, wherein the activation component is ammonium chloride.

2. The method as claimed in claim 1, wherein the sacrificial zone is formed by areas of the superalloy component that have the impregnation component.

3. The method as claimed in claim 1, wherein the impregnation component penetrates by diffusion into the superalloy component directly from the gas phase or after deposition on the superalloy component.

4. The method as claimed in claim 1, wherein the heat treatment temperature is below the lowest melting point of the impregnation component.

5. The method as claimed in claim 1, wherein the sacrificial zone includes aluminum or aluminum compounds.

6. The method as claimed in claim 1, wherein the superalloy component is a coated turbine blade.

7. A method for removal of a layer area of a superalloy component, the layer area containing a metal and a corroded portion, comprising:

applying a multi-component cleaning agent locally to a surface of the superalloy component, the cleaning agent having an impregnation component that diffuses into the layer area and an activation component;

heat treating the superalloy component with the applied cleaning agent so the impregnation component and the activation component form a gaseous compound;

forming a sacrificial zone partially in the layer area to reduce a removal resistance of the layer area;

removing the cleaning agent from the surface of the superalloy component;

thermally treating the superalloy component; and removing the layer area from the superalloy component, wherein only aluminum is diffused into the layer area.

8. The method as claimed in claim 7, wherein the sacrificial zone is formed by areas of the superalloy component that have the impregnation component.

9. The method as claimed in claim 7, wherein the impregnation component penetrates by diffusion into the superalloy component directly from the gas phase or after deposition on the superalloy component.

10. The method as claimed in claim 7, wherein the heat treatment temperature is below the lowest melting point of the impregnation component.

11. The method as claimed in claim 7, wherein the sacrificial zone includes aluminum or aluminum compounds.

12. The method as claimed in claim 7, wherein the superalloy component is a coated turbine blade.

13. A method for removal of a layer area of a superalloy component, the layer area containing a metal and a corroded portion, comprising:

applying a multi-component cleaning agent locally to a surface of the superalloy component, the cleaning agent having an impregnation component that diffuses into the layer area and an activation component;

heat treating the superalloy component with the applied cleaning agent so the impregnation component and the activation component form a gaseous compound;

forming a sacrificial zone partially in the layer area to reduce a removal resistance of the layer area;

removing the cleaning agent from the surface of the superalloy component;

thermally treating the superalloy component; and removing the layer area from the superalloy component, wherein the activation component is ammonium chloride, and wherein only aluminum is diffused into the layer area.

14. The method as claimed in claim 13, wherein the sacrificial zone is formed by areas of the superalloy component that have the impregnation component.

15. The method as claimed in claim 13, wherein the impregnation component penetrates by diffusion into the superalloy component directly from the gas phase or after deposition on the superalloy component.

16. The method as claimed in claim 13, wherein the heat treatment temperature is below the lowest melting point of the impregnation component.

17. The method as claimed in claim 13, wherein the sacrificial zone includes aluminum or aluminum compounds.

18. The method as claimed in claim 13, wherein the superalloy component is a coated turbine blade.

* * * * *